United States Patent
Song et al.

(10) Patent No.: US 11,800,336 B2
(45) Date of Patent: Oct. 24, 2023

(54) METHOD AND APPARATUS FOR CHECKING LIVENESS IN MACHINE TO MACHINE SYSTEM

(71) Applicants: Hyundai Motor Company, Seoul (KR); Kia Corporation, Seoul (KR); Industry Academy Cooperation Foundation of Sejong University, Seoul (KR)

(72) Inventors: Jae Seung Song, Seoul (KR); Min Byeong Lee, Gyeonggi-do (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 279 days.

(21) Appl. No.: 17/236,387

(22) Filed: Apr. 21, 2021

(65) Prior Publication Data

US 2021/0337367 A1 Oct. 28, 2021

Related U.S. Application Data (60) Provisional application No. 63/013,837, filed on Apr. 22, 2020.

(51) Int. Cl.
| | |
|---|---|
| *H04W 4/70* | (2018.01) |
| *H04W 24/08* | (2009.01) |
| *H04W 60/00* | (2009.01) |
| *H04W 24/10* | (2009.01) |
| *H04W 72/51* | (2023.01) |

(52) U.S. Cl.
CPC ............. *H04W 4/70* (2018.02); *H04W 24/08* (2013.01); *H04W 24/10* (2013.01); *H04W 60/00* (2013.01); *H04W 72/51* (2023.01)

(58) Field of Classification Search
CPC ....... H04W 4/70; H04W 24/08; H04W 24/10; H04W 60/00; H04W 72/51; H04W 24/06; H04L 43/10; H04L 43/06; H04L 43/08; H04L 43/16; H04L 67/12; H04L 67/51
See application file for complete search history.

(56) References Cited

U.S. PATENT DOCUMENTS

| | | | |
|---|---|---|---|
| 10,397,085 B1 * | 8/2019 | Seth ..................... | G06F 11/0709 |
| 11,438,257 B2 * | 9/2022 | Rolando ................. | H04L 49/20 |
| 2016/0261474 A1 * | 9/2016 | Raghavan ............... | H04L 43/10 |

(Continued)

FOREIGN PATENT DOCUMENTS

| | | | | |
|---|---|---|---|---|
| WO | WO-2016153402 A1 * | 9/2016 | ............. | H04L 43/00 |

OTHER PUBLICATIONS

Fault Diagnosis in Wireless Sensor Networks: A Survey, Mahapatro et al, IEEE, 2013 (Year: 2013).*

(Continued)

*Primary Examiner* — Habte Mered
(74) *Attorney, Agent, or Firm* — Fox Rothschild LLP (57) ABSTRACT

A liveness check in a machine-to-machine (M2M) system is provided. A method for operating an M2M device includes generating a resource including information on a liveness check for a local device and confirming whether a probe signal for the liveness check is received from the local device. The liveness status of the local device is determined based on whether the probe signal is received.

20 Claims, 7 Drawing Sheets

(56) References Cited

U.S. PATENT DOCUMENTS

| | | | | |
|---|---|---|---|---|
| 2018/0295190 A1* | 10/2018 | Lu | .......................... | H04L 67/146 |
| 2021/0126848 A1* | 4/2021 | Wang | ................... | G06F 9/45558 |
| 2021/0319642 A1* | 10/2021 | Boyd | ..................... | G07C 13/00 |
| 2022/0141116 A1* | 5/2022 | Kawano | ................... | H04L 43/12 |
| | | | | 709/224 |

OTHER PUBLICATIONS

RFC 5880, IETF, Katz et al, "Bidirectional Forwarding Detection (BFD) ",Jun. 2010 (Year: 2010).*
RFC 7880, IETF, Pignataro et al, "Seamless Bidirectional Forwarding Detection (S-BFD)", Jul. 2016 (Year: 2016).*

* cited by examiner

FIG. 11

METHOD AND APPARATUS FOR CHECKING LIVENESS IN MACHINE TO MACHINE SYSTEM

CROSS REFERENCE TO RELATED APPLICATION

The present application claims priority to a U.S. provisional application 63/013,837, filed Apr. 22, 2020, the entire contents of which are incorporated herein for all purposes by this reference.

BACKGROUND

Field of the Disclosure

The present disclosure relates to a method and apparatus for checking liveness in a machine-to-machine (M2M) system, and more particularly, to a method and apparatus for checking liveness of an Internet of Things (IoT) device like a sensor in an M2M system.

Description of the Related Art

Recently, introduction of a Machine-to-Machine (M2M) system has become active. An M2M communication may refer to a communication performed between machines without human intervention. Particularly, M2M may refer to Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present disclosure provides a method and apparatus for effectively checking liveness in an M2M system. The present disclosure is directed to provide a method and apparatus for checking liveness of an IoT device like a sensor in an M2M system. The present disclosure is directed to provide a method and apparatus for managing a resource including information on a liveness check for an IoT device in an M2M system.

According to an exemplary embodiment of the present disclosure, an operation method of a machine-to-machine (M2M) apparatus in an M2M system may include generating a resource including information on a liveness check for a local device, confirming whether a probe signal for the liveness check is received from the local device, and based on whether the probe signal is received, determining liveness status of the local device.

According to an exemplary embodiment of the present disclosure, an M2M apparatus in an M2M system may include a transceiver and a processor coupled to the transceiver. The processor may be configured to generate a resource including information on a liveness check for a local device, confirms whether a probe signal for the liveness check is received from the local device, and determine liveness status of the local device based on whether the probe signal is received. According to the present disclosure, liveness of a device in an M2M system may be checked more effectively.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may be configured to operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and is not limited to the embodiment described above.

For example, the present disclosure mainly describes an M2M system but is not solely applied thereto. In addition, an M2M server may be a server that performs communication with an M2M terminal or another M2M server. An M2M gateway may be a connection point between an M2M terminal and an M2M server. For example, when an M2M terminal and an M2M server have different networks, the M2M terminal and the M2M server may be connected via an M2M gateway. Herein, for example, both an M2M gateway and an M2M server may be M2M terminals and are not limited to the exemplary embodiment described above.

Further, oneM2M is a de facto standards organization that was founded to develop a communal IoT service platform sharing and integrating application service infrastructure (platform) environments beyond fragmented service platform development structures limited to separate industries like energy, transportation, national defense and public service.oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health.

In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

Figure 1:
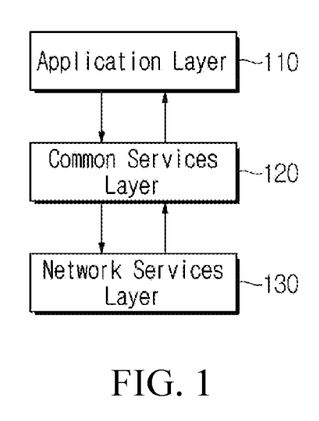
FIG. 1 illustrates a layered structure of a machine-to-machine (M2M) system according to the present disclosure.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE). The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
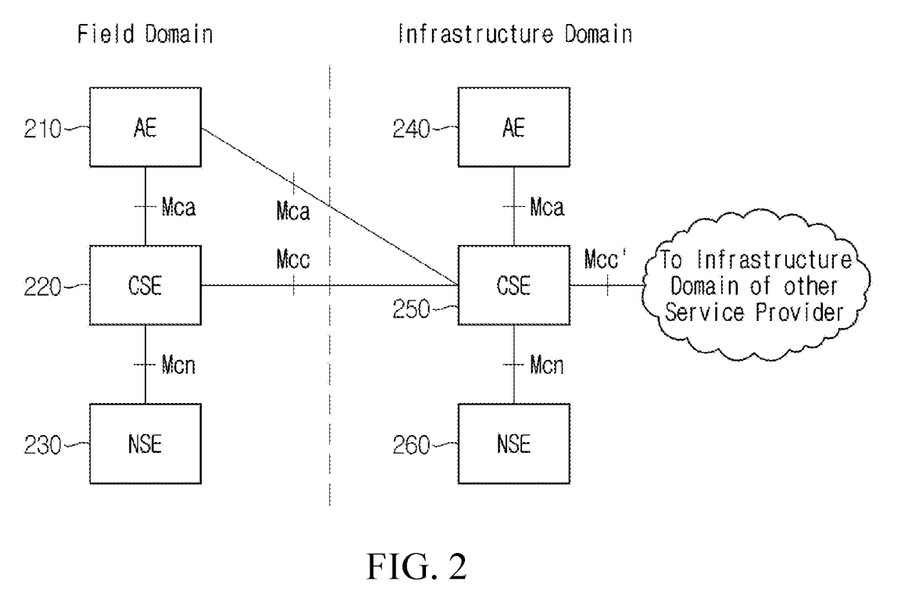
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
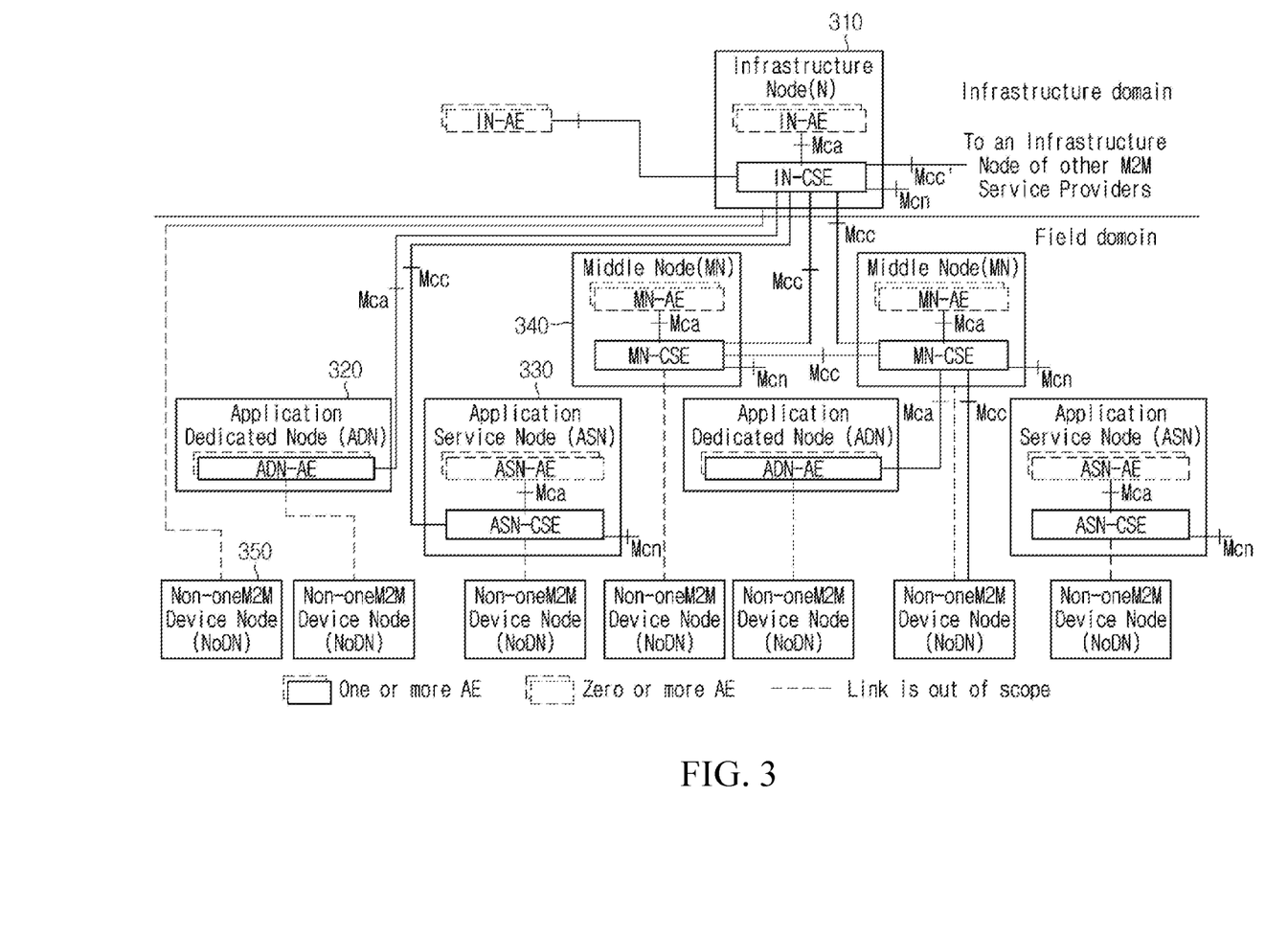
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
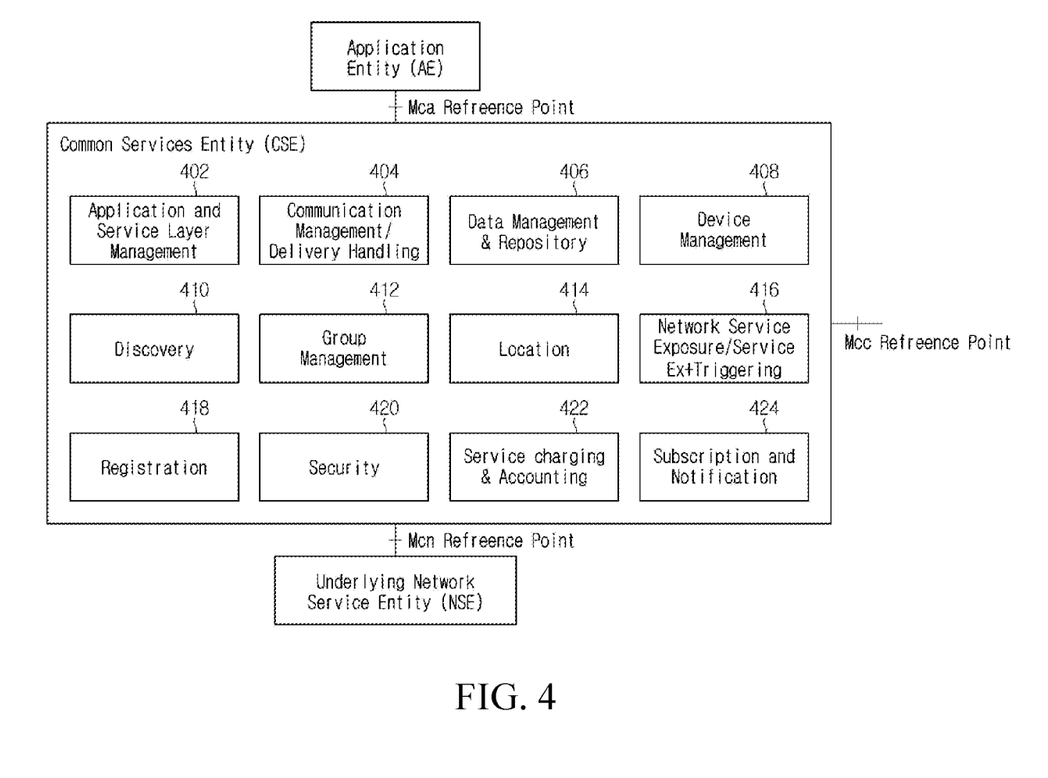
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may be configured to provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may be configured to operate based on a common service function. In addition, a common service function may be possible in other exemplary embodiments and is not limited to the above-described exemplary embodiment.

The application and service layer management 402 CSF may be configured to provide management of AEs and CSEs. The application and service layer management 402 CSF includes the configuring, problem solving and upgrading of CSE functions and also the capability of upgrading AEs. The communication management and delivery handling 404 CSF provides communications with other CSEs, AEs and NSEs. The communication management and delivery handling 404 CSF may be configured to determine at what time and through what connection communications are to be delivered, and determine to buffer communication requests to deliver the communications later, if necessary and permitted.

The data management and repository 406 CSF may be configured to provide data storage and transmission functions (for example, data collection for aggregation, data reformatting, and data storage for analysis and sematic processing). The device management 408 CSF may be configured to provide the management of device capabilities in M2M gateways and M2M devices. The discovery 410 CSF may be configured to provide an information retrieval function for applications and services based on filter criteria. The group management 412 CSF may be configured to provide processing of group-related requests. The group management 412 CSF enables an M2M system to support bulk operations for many devices and applications. The location 414 CSF may be configured to enable AEs to obtain geographical location information.

The network service exposure/service execution and triggering 416 CSF may be configured to manage communications with base networks for access to network service functions. The registration 418 CSF may be configured to provide AEs (or other remote CSEs) to a CSE. The registration 418 CSF allows AEs (or remote CSE) to use services of CSE. The security 420 CSF may be configured to provide a service layer with security functions like access control including identification, authentication and permission. The service charging and accounting 422 CSF may be configured to provide charging functions for a service layer. The subscription/notification 424 CSF may be configured to allow subscription to an event and notifying the occurrence of the event.

Figure 5:
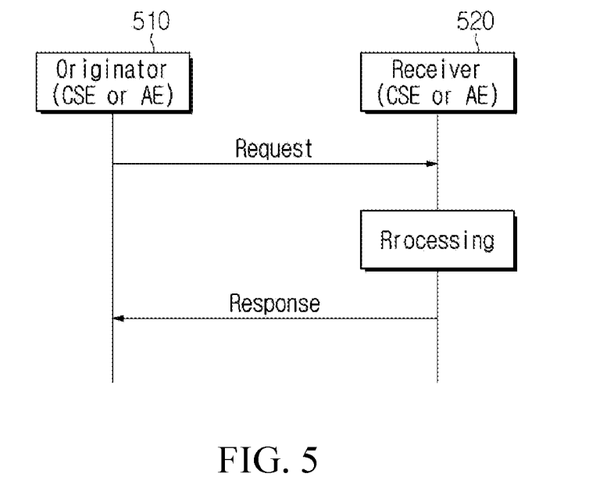
FIG. 5 illustrates a method in which an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. In particular, they are not limited to the above-described exemplary embodiment. For example, the originator 510 and the receiver 520 may be nodes, entities, servers or gateways, which are described above. In other words, the originator 510 and the receiver 520 may be hardware or software configurations and are not limited to the above-described exemplary embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code-successful, unsuccessful, ack
Request Identifier-uniquely identifies a Request message
Content-to be transferred
To-the identifier of the Originator or the Transit CSE that sent the corresponding non-blocking request
From-the identifier of the Receiver
Originating Timestamp-when the message was built
Result Expiration Timestamp-when the message expires
Event Category-what event category shall be used for the response message
Content Status
Content Offset
Token Request Information
Assigned Token Identifiers
Authorization Signature Request Information
Release Version Indicator-the oneM2M release version that this response message conforms to A filter criteria condition, which may be used in a request message or a response message, may be defined as in Table 2 and Table 3 below.

TABLE 2

Matching Conditions

| Condition tag | Multi-plicity | Description |
| --- | --- | --- |
| createdBefore | 0..1 | The creationTime attribute of the matched resource is chronologically before the specified value. |
| createdAfter | 0..1 | The creationTime attribute of the matched resource is chronologically after the specified value. |
| modifiedSince | 0..1 | The lastModifiedTime attribute of the matched resource is chronologically after the specified value. |
| unmodifiedSince | 0..1 | The lastModifiedTime attribute of the matched resource is chronologically before the specified value. |
| stateTagSmaller | 0..1 | The stateTag attribute of the matched resource is smaller than the specified value. |
| stateTagBigger | 0..1 | The stateTag attribute of the matched resource is bigger than the specified value. |
| expireBefore | 0..1 | The expirationTime attribute of the matched resource is chronologically before the specified value. |
| expireAfter | 0..1 | The expirationTime attribute of the matched resource is chronologically after the specified value. |
| labels | 0..1 | The labels attribute of the matched resource matches the specified value. |
| labelsQuery | 0..1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0..1 | A child of the matched resource has labels attributes matching the specified value. The evaluation is the same as for the labels attribute above. Details are defined in [3]. |
| parentLabels | 0..1 | The parent of the matched resource has labels attributes matching the specified value. The evaluation is the same as for the labels attribute above. Details are defined in [3]. |
| resourceType | 0..n | The resourceType attribute of the matched resource is the same as the specified value. It also allows differentiating between normal and announced resources. |
| childResourceType | 0..n | A child of the matched resource has the resourceType attribute the same as the specified value. |
| parentResourceType | 0..1 | The parent of the matched resource has the resourceType attribute the same as the specified value. |
| sizeAbove | 0..1 | The contentSize attribute of the <contentInstance> matched resource is equal to or greater than the specified value. |
| sizeBelow | 0..1 | The contentSize attribute of the <contentInstance> matched resource is smaller than the specified value. |

TABLE 2-continued

Matching Conditions

| Condition tag | Multi-plicity | Description |
| --- | --- | --- |
| contentType | 0..n | The contentInfo attribute of the <contentInstance> matched resource matches the specified value. |
| attribute | 0..n | This is an attribute of resource types (clause 9.6). Therefore, a real tag name is variable and depends on its usage and the value of the attribute can have wild card *. E.g., creator of container resource type can be used as a filter criteria tag as "creator = Sam", "creator = Sam*", "creator = *Sam". |
| childAttribute | 0..n | A child of the matched resource meets the condition provided. The evaluation of this condition is similar to the attribute matching condition above. |
| parentAttribute | 0..n | The parent of the matched resource meets the condition provided. The evaluation of this condition is similar to the attribute matching condition above. |
| semanticsFilter | 0..n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0..n | Indicates the logical operation (AND/OR) to be used for different condition tags. The default value is logical AND. |
| contentFilterSyntax | 0..n | Indicates the Identifier for syntax to be applied for content-based discovery. |
| contentFilterQuery | 0..n | The query string shall be specified when contentFilterSyntax parameter is present. |

TABLE 3

Filter Handling Conditions

| Condition tag | Multi-plicity | Description |
| --- | --- | --- |
| filterUsage | 0..1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0..1 | The maximum number of resources to be included in the filtering result. This may be modified by the Hosting CSE. When it is modified, then the new value shall be smaller than the suggested value by the Originator. |
| level | 0..1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0..1 | The number of direct child and descendant resources that a Hosting CSE shall skip over and not include within a Retrieve response when processing a Retrieve request to a targeted resource. |
| applyRelativePath | 0..1 | This attribute contains a resource tree relative path (e.g., . . . /tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

Request message parameter

| | |
|---|---|
| Mandatory | Operation-operation to be executed/CREAT, Retrieve, Update, Delete, Notify |
| | To-the address of the target resource on the target CSE |
| | From-the identifier of the message Originator |
| | Request Identifier-uniquely identifies a Request message |
| Operation dependent | Content-to be transferred |
| | Resource Type-of resource to be created |
| Optional | Originating Timestamp-when the message was built |
| | Request Expiration Timestamp-when the request message expires |
| | Result Expiration Timestamp-when the result message expires |
| | Operational Execution Time-the time when the specified operation is to be executed by the target CSE |
| | Response Type-type of response that shall be sent to the Originator |
| | Result Persistence-the duration for which the reference containing the responses is to persist |
| | Result Content-the expected components of the result |
| | Event Category-indicates how and when the system should deliver the message |
| | Delivery Aggregation-aggregation of requests to the same target CSE is to be used |
| | Group Request Identifier-Identifier added to the group request that is to be fanned out to each member of the group |
| | Group Request Target Members-indicates subset of members of a group |
| | Filter Criteria-conditions for filtered retrieve operation |
| | Desired Identifier Result Type-format of resource identifiers returned |
| | Token Request Indicator-indicating that the Originator may attempt Token Request procedure (for Dynamic Authorization) if initiated by the Receiver |
| | Tokens-for use in dynamic authorization |
| | Token IDs-for use in dynamic authorization |
| | Role IDs-for use in role based access control |
| | Local Token IDs-for use in dynamic authorization |
| | Authorization Signature Indicator-for use in Authorization Relationship Mapping |
| | Authorization Signature-for use in Authorization Relationship Mapping |
| | Authorization Relationship Indicator-for use in Authorization Relationship Mapping |
| | Semantic Query Indicator-for use in semantic queries |
| | Release Version Indicator-the oneM2M release version that this request message conforms to. |
| | Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Figure 6:
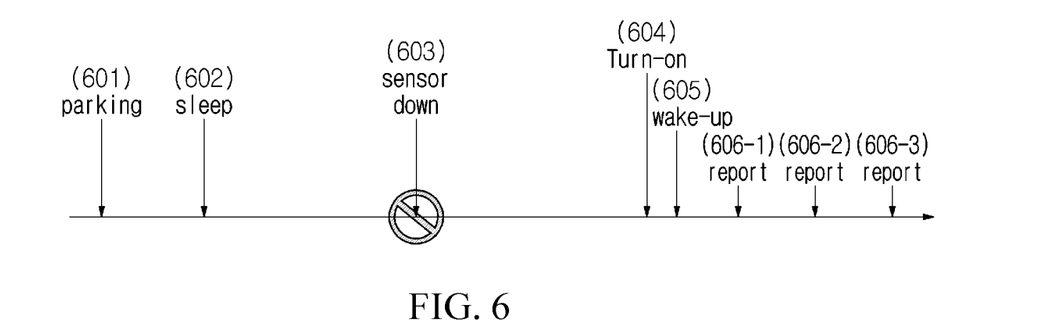
FIG. 6 illustrates an example of status change of a sensor in an M2M system according to the present disclosure.

An IoT system like a oneM2M system is applicable to vehicles. When the IoT system is applied to a vehicle, the vehicle dashboard monitor may not output any readings until the vehicle is traveling along the road. For example, this situation may occur on a tire safeguard system. When no operation is detected, sensors on each tire may enter into a sleep mode to conserve battery consumption, as shown in FIG. 6. FIG. 6 illustrates an example of status change of a sensor device in an M2M system according to the present disclosure. FIG. 6 illustrates a status change of a sensor device according to the operation of a vehicle.

Referring to FIG. 6, when a parking event of a vehicle occurs at step 601, a sensor may enter into a sleep mode at step 602. Next, before the vehicle is turned on again at step 604, the sensor device may enter into an abnormal status, thereby being down (e.g., due to the malfunction of abnormal state) at step 603. However, since the sensor entered into the sleep mode and a wake-up condition is not satisfied yet, the abnormal status of the sensor may not be identified. When the vehicle is turned on at step 604, the wake-up of the sensor may be requested at step 605 and a report of sensor information may be requested at steps 606-1 to 606-3, the sensor may not respond since the sensor is in the abnormal status. Accordingly, a system or a controller of the system may then be configured to recognize or detect the abnormality of the sensor. In other words, even when a sensor does not operate for various reasons (e.g., broken, malfunction and failure), there is no way to check and begin to report such an abnormal status before there is a movement of the vehicle. Accordingly, the present disclosure suggests exemplary embodiments for confirming periodically whether an IoT device (e.g., a sensor) has a normal status, that is, for confirming periodically liveness of an IoT device (e.g., determining whether the sensor has failed).

Figure 7:
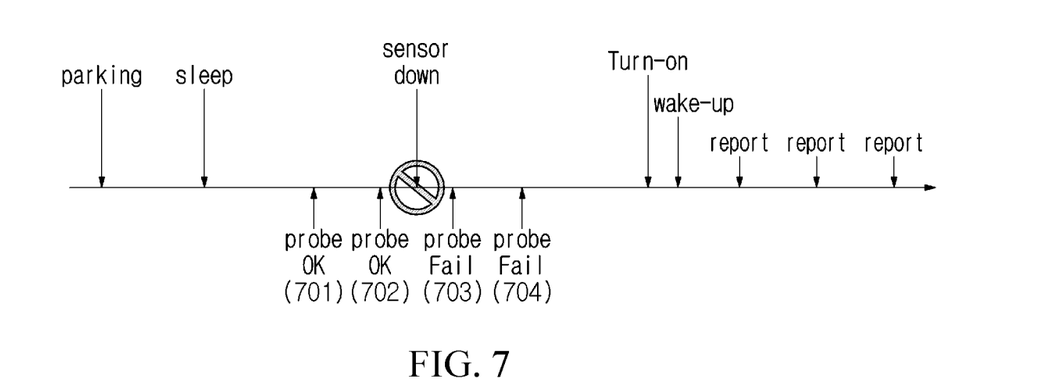
FIG. 7 illustrates an example of liveness check for a sensor in an M2M system according to the present disclosure.

FIG. 7 illustrates an example of liveness check for a sensor in an M2M system according to the present disclosure. Referring to FIG. 7, an IoT platform of a vehicle may be configured to confirm liveness of a sensor device through probes that are periodically received, that is, through the occurrence of probe OK events at steps 701 and 702. However, after a sensor is down, no probe is received. In other words, as probe failure events occur at steps 703 and 704, an IoT platform of a vehicle may be configured to recognize an abnormal status of a sensor.

Typically, there is a mechanism for checking the liveness of a system. PING or Heartbeat used in an Open Secure Sockets Layer (OPENSSL) is a typical example. An IoT platform requires the capability to check the liveness of its managing devices. The capability allows the IoT platform to check failed devices in sleep mode.

Figure 8:
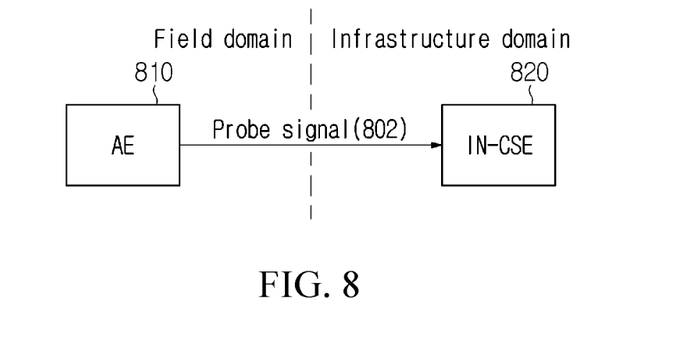
FIG. 8 illustrates a concept of liveness check in an M2M system according to the present disclosure.

FIG. 8 illustrates a concept of liveness check in an M2M system according to the present disclosure. Referring to FIG. 8, an AE 810 in a field domain may be configured to transmit a probe signal 802 to an IN-CSE 820 in an infrastructure domain. Thus, the IN-CSE 820 is capable of checking the liveness of the AE 810.

According to an exemplary embodiment, the AE 810 may be configured to periodically transmit the probe signal 802. For this, the AE 810 should be designed to periodically transmit a probe. In particular, the IN-CSE 820 may be configured to confirm whether the probe signal 802 is periodically received, and when the probe signal 802 is received less than a predefined threshold number of times, may be configured to recognize an abnormal situation of the AE 810.

An operation related to a probe check may be set by adding attributes related to liveness to a resource in the IN-CSE 820. For example, liveness-related attributes may include at least one of whether a corresponding device supports a liveness checking operation, the liveness status (e.g., normal/abnormal) of the device, a probe transmission interval, a probe transmission protocol (e.g., PING, Heatbeat), and a threshold of probe failure for determining abnormality.

A resource including liveness-related attributes may be a resource defined for liveness or a resource defined for another purpose. For example, the resource areaNwkDeviceInfo, the resource deviceInfo, the resource AE, the resource container, or any resources representing devices may include at least one of the attributes related to liveness. An example of a resource related to liveness check is shown in FIG. 9 below.

Figure 9:
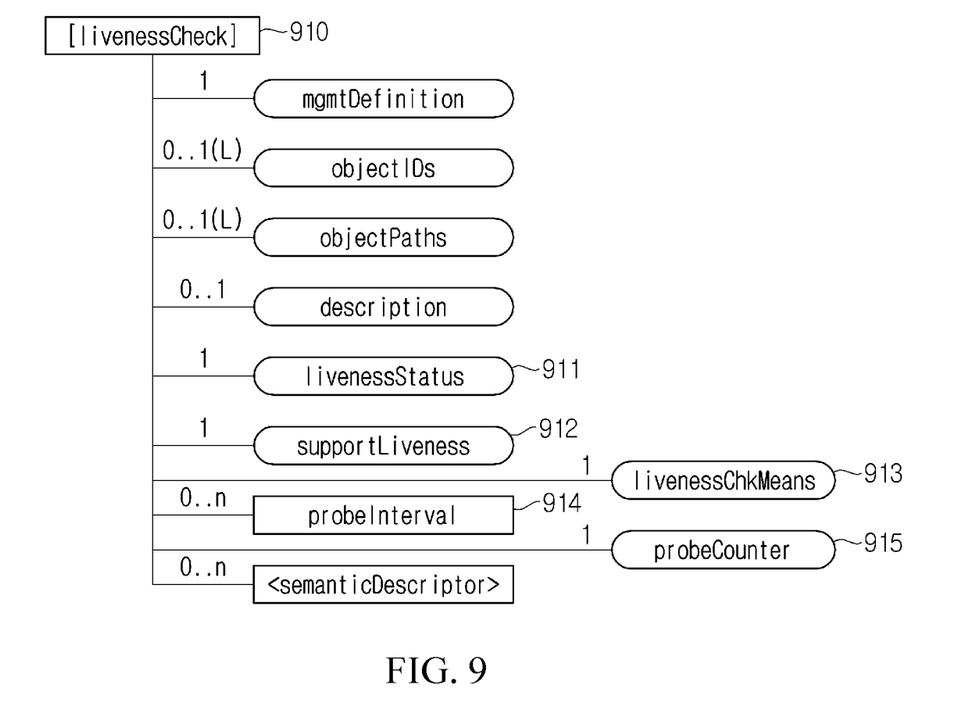
FIG. 9 illustrates an example of resource related to a liveness check in an M2M system according to the present disclosure.

FIG. 9 illustrates an example of resource related to a liveness check in an M2M system according to the present disclosure. FIG. 9 illustrates a structure of a dedicated resource for liveness. Referring to FIG. 9, the resource livenessCheck includes mgmtDefinition, objectIDs, objectPaths, description, livenessStatus 911, supportLiveness 912, livenessChkMeans 913, probeInterval 914, and probeCounter 915. Among the attributes illustrated in FIG. 9, livenessStatus 911, supportLiveness 912, livenessChkMeans 913, probeInterval 914, and probeCounter 915 include information related to a liveness check. The attributes listed in FIG. 9 may be defined as in Table 5 below.

TABLE 5

| Attributes | Multiplicity | RW/RO/WO | Description |
| --- | --- | --- | --- |
| labels | 0..1(L) | RW | See clause 9.6.1.3.<br>Tokens used to add meta-information to resources |
| mgmtDefinition | 1 | WO | See clause 9.6.15.<br>Specifies the type of <mgmtObj> resource (e.g. Software, firmware, memory).<br>Has fixed value "areaNwkDeviceInfo" to indicate that the resource is for area network device information. |
| objectIDs | 0..1(L) | WO | See clause 9.6.15.<br>Contains the list URNs that uniquely identify the technology specific data model objects used for the <mgmtObj> resource as well as the managed function and version it represents. |
| objectPaths | 0..1(L) | WO | See clause 9.6.15.<br>Contains the list of local paths of the technology specific data model objects on the managed entity which is represented by the <mgmtObj> resource in the Hosting CSE. |
| description | 0..1 | RW | See clause 9.6.15.<br>Text format description of <mgmtObj> |
| devId | 1 | RW | Indicates the id of the device. It could be the id of the hardware or nodeId. This attribute is a specialization of [objectAttribute] attribute. |
| devType | 1 | RW | Indicates the type of the device. The attribute also indicates the functions or services that are provided by the device. Examples include temperature sensor, actuator, Zigbee coordinator or Zigbee router. This attribute is a specialization of [objectAttribute] attribute. |
| areaNwkId | 1 | RW | The reference to an areaNwkInfo resource which this device associates with. This attribute is a specialization of [objectAttribute] attribute. |
| sleepInterval | 0..1 | RW | The interval between two sleeps. This attribute is a specialization of [objectAttribute] attribute. |
| sleepDuration | 0..1 | RW | The time duration of each sleep. This attribute is a specialization of [objectAttribute] attribute. |
| status | 0..1 | RW | The status of the device (sleeping or waked up) |
| livenessStatus | 0..1 | RW | The liveness status of the device concerning whether it is properly operating or dead because of some reasons |
| probeInterval | 0..1 | RW | Interval between two probes for checking liveness |
| supportLiveness | 0..1 | RW | The capability to support liveness checking (Not all devices support liveness checking) |
| livenessChkMeans | 0..1 | RW | The means or protocols to check liveness (e.g., PING, Heatbeat) |
| probeCounter | 0..1 | RW | Indicates based on how many probe fails the liveness status is considered to be dead. |

Figure 10:
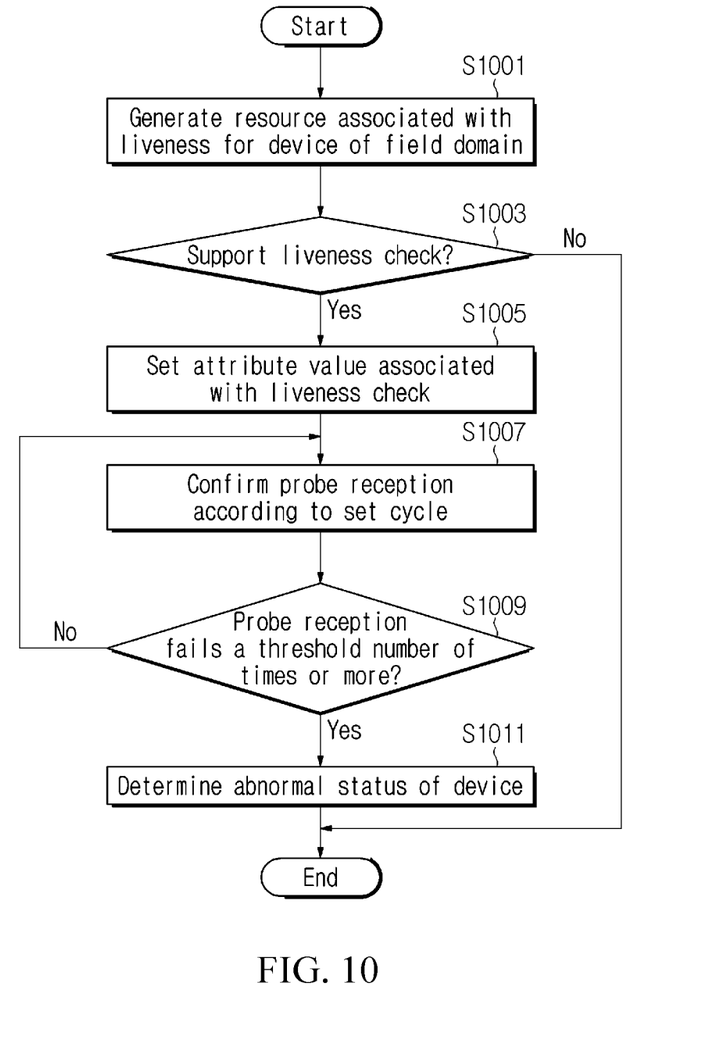
FIG. 10 illustrates an embodiment of procedure for performing a liveness check in an M2M system according to the present disclosure.

FIG. 10 illustrates an exemplary embodiment of procedure for performing a liveness check in an M2M system according to the present disclosure. FIG. 10 illustrates an operation method of a device (e.g., IN-CSE) that performs a liveness check. The device for performing a liveness check may be implemented in the form of a gateway or a cloud server providing an IoT platform. In the description referring to FIG. 10, the operation subject is referred to as "device".

Referring to FIG. 10, in the step S1001, a device may be configured to generate a resource related to liveness for a local device of a field domain (e.g., a device of a field domain). For example, in a process of registering a local device, the device may be configured to generate a resource related to liveness. Alternatively, when a liveness checking function is added to a local device, the device may be configured to generate a resource related to liveness.

In the step S1003, the device may be configured to confirm whether a local device supports a liveness check. Whether a liveness check is supported may be confirmed based on information that is received from a local device. When a local device does not support a liveness check, the device terminates this process. In this case, although not illustrated in FIG. 10, the device may include an attribute indicating that a liveness check is not supported for a resource related to a local device.

On the other hand, when a liveness check is supported, in the step S1005, the device may be configured to set the value of at least one attribute related to the liveness check. For example, at least one attribute includes an attribute notifying that a liveness check is supported, and may further include at least one attribute related to an operation of liveness check. For example, the device may set the value of at least one of a probe transmission cycle/interval, a threshold value for the number of probe reception failures for determining an abnormal status, a liveness status, and a protocol used to transmit a probe. Herein, the value of an attribute may be set based on information that is received from a local device.

In the step S1007, the device may be configured to confirm the reception of a probe according to a set cycle. In other words, the device may be configured to confirm whether a probe is received from a local device according to cycle information included in a resource related to a liveness check. In the step S1009, the device may be configured to determine whether probe reception fails a threshold number of times or more. Herein, a threshold number of times is confirmed based on a threshold value for the number of probe reception failures included in a resource related to a liveness check. In other words, when the failure of probe reception is confirmed, the device may be configured to count how many times in succession probe reception occurs. Additionally, the device may be configured to determine whether the failure of probe reception occurs successively a threshold number of times or more. When the probe reception does not fail a threshold number of times, the device returns to the step S1007.

On the other hand, when the probe reception fails a threshold number of times or more, in the step S1011, the device may be configured to determine that a local device is in an abnormal status. In other words, the device may be configured to recognize that a local device is in an abnormal status, that is, in a dead status. Thus, although not illustrated in FIG. 10, the device may be configured to perform an operation for responding to an abnormal status. For example, the operation may include at least one of an operation of generating alarm, an operation of recording a log for an abnormal status, and an operation of identifying a cause of an abnormal status.

As described above, the device including a CSE of an infrastructure domain may be configured to check the liveness of a device belonging to a field domain. A local device may be designed to support a liveness check, while being fabricated, and may be updated later to support a liveness check through software update. Accordingly, a resource related liveness and relevant attributes may be set to values in the course of operating a local device. For this, when a local device is updated to support a liveness test, that is, to periodically transmit a probe signal, the local device may be configured to transmit a message for updating a liveness-related resource to a device including an IN-CSE. In other words, a local device may be configured to transmit a message informing that a function for supporting a liveness check is added.

Figure 11:
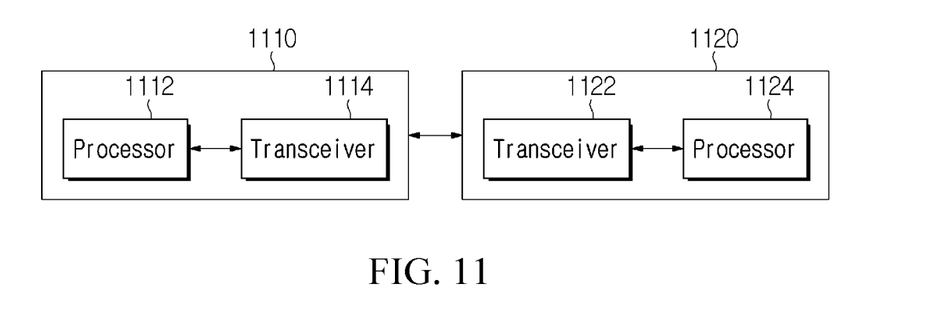
FIG. 11 illustrates a configuration of an M2M apparatus in an M2M system according to the present disclosure.

FIG. 11 illustrates a configuration of an M2M device in an M2M system according to the present disclosure. An M2M device 1110 or an M2M device 1120 illustrated in FIG. 11 may be understood as hardware functioning as at least one among the above-described AE, CSE and NSE. Referring to FIG. 11, the M2M device 1110 may include a processor 1112 configured to operate a device and a transceiver 1114 configured to transmit and receive a signal. Herein, the processor 1112 may be configured to operate the transceiver 1114. In addition, the M2M device 1110 may be configured to communicate with another M2M device 1120. The another M2M device 1120 may also include a processor 1122 and a transceiver 1124, and the processor 1122 and the transceiver 1124 may perform the same function as the processor 1112 and the transceiver 1114.

As an example, the originator, the receiver, AE and CSE, which are described above, may be one of the M2M devices 1110 and 1120 of FIG. 11, respectively. In addition, the devices 1110 and 1120 of FIG. 11 may be other devices. As an example, the devices 1110 and 1120 of FIG. 11 may be communication devices, vehicles, or base stations. In other words, the devices 1110 and 1120 of FIG. 11 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the exemplary embodiments of the present disclosure, it will be apparent to those skilled in the art that various modifications and variations may be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both inventions may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating a machine-to-machine (M2M) device in an M2M system, comprising:
generating, by a processor, a resource including information associated with a liveness check for a local device;
confirming, by the processor, whether a probe signal for the liveness check is received from the local device; and
determining, by the processor, a liveness status of the local device based on whether the probe signal is received,
wherein the information associated with the liveness check includes information indicating whether the local device supports a liveness check function.

2. The method of claim 1, wherein the information associated with the liveness check further includes at least one of a probe transmission cycle or interval, a threshold value for a number of probe reception failures for determining an abnormal status, a liveness status, and a protocol used to transmit a probe.

3. The method of claim 1, wherein the determining of the liveness status comprises, determining that the local device is in an abnormal status in response to determining that a number of consecutive signal reception failures reaches a threshold which is designated by the information, or more.

4. The method of claim 1, further comprising:
performing an operation for responding to an abnormal status, in response to determining that the liveness status of the local device is the abnormal status.

5. The method of claim 4, wherein the operation includes at least one of an operation of generating alarm and an operation of recording a log for an abnormal status.

6. The method of claim 1, wherein the resource includes one of resource areaNwkDeviceInfo, resource deviceInfo, resource application entity (AE), and resource container.

7. The method of claim 1, wherein the resource is generated during a procedure for registering the local device.

8. The method of claim 1, wherein the resource is generated when the local device is updated to support the liveness check.

9. The method of claim 1, further comprising:
receiving, from the local device, a message providing an indication that a function for supporting the liveness check is added.

10. The method of claim 1, further comprising:
receiving, from the local device, a message including information associated with the liveness check.

11. A machine-to-machine (M2M) device in an M2M system, the M2M device comprising:
a transceiver; and
a processor coupled to the transceiver and configured to:
generate a resource including information associated with a liveness check for a local device,
confirm whether a probe signal for the liveness check is received from the local device, and
determine liveness status of the local device based on whether the probe signal is received,
wherein the information associated with the liveness check includes information indicating whether the local device supports a liveness check function.

12. The M2M device of claim 11, wherein the information associated with the liveness check further includes at least one of a probe transmission cycle or interval, a threshold value for a number of probe reception failures for determining an abnormal status, a liveness status, and a protocol used to transmit a probe.

13. The M2M device of claim 11, wherein the processor is further configured to determine that the local device is in an abnormal status in response to determining that a number of consecutive signal reception failures reaches a threshold which is designated by the information, or more.

14. The M2M device of claim 11, wherein the processor is further configured to perform an operation for responding to an abnormal status in response to determining that the liveness status of the local device is the abnormal status.

15. The M2M device of claim 14, wherein the operation includes at least one of an operation of generating alarm and an operation of recording a log for an abnormal status.

16. The M2M device of claim 11, wherein the resource includes one of resource areaNwkDeviceInfo, resource deviceInfo, resource application entity (AE), and resource container.

17. The M2M device of claim 11, wherein the resource is generated during a procedure for registering the local device.

18. The M2M device of claim 11, wherein the resource is generated when the local device is updated to support the liveness check.

19. The M2M device of claim 11, wherein the processor is further configured to receive, from the local device, a message providing an indication that a function for supporting the liveness check is added.

20. The M2M device of claim 11, wherein the processor is further configured to receive, from the local device, a message including information associated with the liveness check.

* * * * *